(12) United States Patent
Matsumoto et al.

(10) Patent No.: US 6,725,822 B2
(45) Date of Patent: Apr. 27, 2004

(54) INTAKE SYSTEM FOR MULTI-CYLINDER ENGINE

(75) Inventors: Takashi Matsumoto, Miyagi (JP); Masahiko Kikuchi, Miyagi (JP); Tomonori Ikuma, Saitama (JP); Tetsu Wada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/143,820

(22) Filed: May 14, 2002

(65) Prior Publication Data

US 2002/0185100 A1 Dec. 12, 2002

(30) Foreign Application Priority Data

| May 31, 2001 | (JP) | ........................................ | 2001-165092 |
| May 15, 2001 | (JP) | ........................................ | 2001-145363 |
| May 15, 2001 | (JP) | ........................................ | 2001-145364 |
| May 15, 2001 | (JP) | ........................................ | 2001-145365 |
| May 15, 2001 | (JP) | ........................................ | 2001-145366 |

(51) Int. Cl.$^7$ ............................................. F02M 35/10
(52) U.S. Cl. ............................ 123/184.34; 123/184.36
(58) Field of Search ....................... 123/184.36, 184.53, 123/184.54, 184.55, 184.34, 184.35, 184.42, 184.43, 184.44

(56) References Cited

U.S. PATENT DOCUMENTS

| 4,708,097 A | * 11/1987 | Hatamura et al. ..... 123/184.36 |
| 4,738,229 A | 4/1988 | Wada et al. |
| 4,803,961 A | 2/1989 | Hiraoka et al. |
| 4,922,864 A | * 5/1990 | Maeda ................... 123/184.28 |
| 4,981,115 A | * 1/1991 | Okasako et al. ....... 123/184.35 |
| 5,012,771 A | * 5/1991 | Oda et al. .............. 123/184.38 |
| 5,056,473 A | 10/1991 | Asaki et al. |
| 5,632,239 A | 5/1997 | Patyi et al. |
| 2002/0073949 A1 | * 6/2002 | Watanabe et al. ...... 123/184.36 |

FOREIGN PATENT DOCUMENTS

| DE | 40 14 291 | 11/1991 | |
| EP | 1264974 A1 | * 12/2002 | ........... F02B/27/02 |
| JP | 9-88746 | 3/1997 | |

OTHER PUBLICATIONS

Patent Abstracts of Japan, vol. 009, No. 198 (M–404), Aug. 15, 1985 & JP 60 062655, Apr. 10, 1985.

* cited by examiner

*Primary Examiner*—Willis R. Wolfe
(74) *Attorney, Agent, or Firm*—Arent Fox, PLLC

(57) ABSTRACT

In an intake system of a variable air-intake characteristic type for a multi-cylinder engine, an intake air-dispensing box is comprised of a dispensing box body which includes an intake air inlet, first and second intake branch pipes and one of halves of a partition wall and which has an opening provided in its outer wall opposite from the first and second intake branch pipes to extend between first and second dispensing chambers, and a lid detachably coupled to the dispensing box body to close the opening and having the other half of the partition wall. The lid is made of a light alloy by casting, and a valve bore and bearing bores for supporting a valve shaft of the on-off valve are defined in the other half of the partition wall. Thus, it is possible to carry out the maintenance of the on-off valve only by removing the lid disposed outside the intake air-dispensing box from the box, leading to an enhancement in maintenance property.

15 Claims, 13 Drawing Sheets

INTAKE SYSTEM FOR MULTI-CYLINDER ENGINE

BACKGROUND OF THE INVENTION

1. Field of the Invention

The present invention relates to an intake system for a multi-cylinder engine, in which an intake air inlet is provided in an intake air-dispensing box to lead to an intake passage in a throttle body; the inside of the intake air-dispensing box is divided by a partition wall into first and second dispensing chambers communicating with the intake air inlet; first and second intake branch pipes opening into the first and second dispensing chambers and leading to intake ports in first and second banks of the engine are connected to the intake air-dispensing box; and an on-off valve is mounted in the partition wall and capable of permitting the first and second dispensing chambers to be put into and out of communication with each other, so that the air-charging characteristic can be changed by opening and closing the on-off valve depending on the operational state of the engine, thereby maintaining a high outputting performance in a wider operational range from a low speed to a high speed.

2. Description of the Related Art

A conventional intake system for a multi-cylinder engine is already known, as disclosed, for example, in Japanese Patent Application Laid-open No. 9-88746.

In the intake system disclosed in the above Japanese Patent Application Laid-open No. 9-88746, the partition wall supporting the on-off valve and having a valve bore opened and closed by the on-off valve is interposed between a dispensing box body and an intake manifold. Therefore, to carry out the maintenance of the on-off valve, a troublesome operation of disassembling the dispensing box body and the intake manifold from each other is required, so that the maintenance property is not good.

SUMMARY OF THE INVENTION

Accordingly, it is an object of the present invention to provide an intake system of the above-described type for a multi-cylinder engine, wherein the maintenance of the on-off valve can be carried out only by removing a lid mounted outside the intake air-dispensing box from the box, leading to a good maintenance property.

To achieve the above object, according to a first aspect and feature of the present invention, there is provided an intake system for a multi-cylinder engine, in which an intake air inlet is provided in an intake air-dispensing box to lead to an intake passage in a throttle body; the inside of the intake air-dispensing box is divided by a partition wall into first and second dispensing chambers communicating with the intake air inlet; first and second intake branch pipes opening into the first and second dispensing chambers respectively and leading to intake ports in first and second banks of the engine respectively are connected to the intake air-dispensing box; and an on-off valve capable of permitting the first and second dispensing chambers to be put into and out of communication with each other is mounted in the partition wall; wherein the intake air-dispensing box is comprised of a dispensing box body which includes the intake air inlet, the first and second intake branch pipes and one of halves of the partition wall and which has an opening provided in its outer wall opposite from the first and second intake branch pipes to extend between the first and second dispensing chambers, and a lid detachably coupled to the dispensing box body to close the opening and having the other half of the partition wall, the lid being made of a light alloy by casting, and a valve bore permitting the first and second dispensing chambers to be put into communication with each other and bearing bores for supporting a valve shaft of the on-off valve for opening and closing the valve bore are defined in the other half of the partition wall.

With the first feature, a single assembly is formed by the lid and the on-off valve and hence, the maintenance of the on-off valve and the members around the on-off valve can be carried out easily by removing the lid from the dispensing box body, thereby contributing to an enhancement in maintenance property.

Moreover, the lid made of the light alloy by casting is small in size and simple in shape, as compared with the dispensing box body integral with the intake branch pipes and hence, can be precisely formed by casting such as high-pressure die-casting. Therefore, the post-processing of the valve bore is not required and moreover, the lid having such a high quality that deformation cannot be generated therein even due to a change in the surrounding temperature, can be produced easily, and the good opening and closing operation of the on-off valve supported on the lid can be always ensured irrespective of the change in the surrounding temperature.

According to a second aspect and feature of the present invention, in addition to the first feature, the other half of the partition wall is divided into a main partition other-half body and a partition piece so that the valve bore is divided along the bearing bores into halves, the partition piece being bolted to the main partition other-half body.

With the second feature, when the main partition other-half body and the partition piece of the partition wall are produced by casting, the halves of the valve bore included respectively in the main partition other-half body and the partition piece can be die-formed simply, and a troublesome processing for the valve bore is not required after the casting, leading to an enhancement in productivity.

According to a third aspect and feature of the present invention, there is provided an intake system for a V-type engine for an outboard engine system, which is disposed with a crankshaft placed vertically and with heads of left and right banks directed rearwards and which is covered with an engine hood; wherein an intake air inlet is provided in vertically one side of a longitudinally flat intake air-dispensing box disposed between the left and right banks and a rear wall of the engine hood so that the intake air inlet leads to an intake passage in a throttle body; the inside of the intake air-dispensing box is divided by a partition wall into left and right dispensing chambers communicating the intake air inlet and extending vertically; an on-off valve capable of permitting the left and right dispensing chambers to be put into and out of communication with each other is mounted in the partition wall; left and right intake branch pipes opening into the left and right dispensing chambers respectively and leading to intake ports in the left and right banks respectively are connected to a front wall of the intake air-dispensing box; the intake air-dispensing box is comprised of a dispensing box body which includes the intake air inlet, the left and right intake branch pipes and one of halves of the partition wall and which has an opening provided in its outer wall opposite from the left and right intake branch pipes to extend between the left and right dispensing chambers, and a lid which is made of a light alloy by casting and detachably coupled to the dispensing box body to close the opening and which has the other half of the partition wall; the on-off valve is mounted to a valve shaft rotatably supported in the other half and extending vertically; an operating lever is secured to an outer end of the valve shaft protruding toward the vertically other end of the intake air-dispensing box; and an actuator for turning the operating lever to open and close the on-off valve is mounted at the other end of the intake air-dispensing box and accommodated within an area of a vertically projected view of the intake air-dispensing box.

With the third feature, resonant supercharging intake systems corresponding to low-speed and high-speed operational ranges of the engine are formed by opening and closing of the on-off valve, whereby a high outputting performance can be exhibited in a wider operational range. Moreover, the longitudinally flat intake air-dispensing box is disposed in proximity to the heads of the left and right banks of the engine and hence, can be disposed in a narrow space between the engine and the rear wall of the engine hood. Thus, it is possible to provide an enhancement in a space efficiency of the engine room and to suppress an increase in size of the engine hood.

The single assembly is constituted by the lid and the one-off valve and hence, the maintenance of the on-off valve and members around the latter can be carried out easily by removing the lid from the dispensing box body, thereby contributing to an enhancement in maintenance property.

Moreover, the lid made of the light alloy is small in size and simple in shape, as compared with the dispensing box body integral with the intake branch pipes and hence, can be precisely formed by casting such as high-pressure die-casting. Therefore, the post-processing of the valve bore is not required and moreover, a lid having a high rigidity and such a high quality that deformation cannot be generated even due to a change in the surrounding temperature, can be produced easily, and the good opening and closing operation of the on-off valve supported in the lid can be always ensured irrespectively of the change in the surrounding temperature.

Further, the position of the actuator for opening and closing the on-off valve can be determined freely around the valve shaft by selection of the position of operating lever coupled to the valve shaft of the on-off valve and hence, it is easy to accommodate the actuator within an area of a vertically projected view of the intake air-dispensing box. Thus, it is possible to simply avoid the interference of the actuator with the rear wall of the engine hood disposed in proximity to the rear surface of the intake air-dispensing box. Moreover, the intake air inlet and the actuator are disposed at vertically opposite ends of the intake air-dispensing box and hence, it is also possible to avoid the interference of the intake air inlet and the actuator with each other to provide the compactness of the intake system.

According to a fourth aspect and feature of the present invention, in addition to the third feature, the other half of the partition wall is divided into a main partition other-half body and a partition piece so that the valve bore is divided along the bearing bores into halves, the partition piece being bolted to the main partition other-half body.

With the fourth feature, when the main partition other-half body and the partition piece of the partition wall are produced by casting, the halves of the valve bore included respectively in the main partition other-half body and the partition piece can be die-formed simply, and a troublesome processing for the valve bore is not required after the casting, leading to an enhancement in productivity.

According to a fifth aspect and feature of the present invention, in addition to the third or fourth feature, a recess for accommodating the actuator is defined in the vertically other end face of the intake air-dispensing box.

With the fifth feature, the actuator of a relatively large size can be placed in the narrow engine room without interfering with the intake air-dispensing box and the engine hood.

According to a sixth aspect and feature of the present invention, there is provided an intake system for a multi-cylinder engine, in which an intake air inlet is provided in one end of an intake air-dispensing box disposed on one side of an engine having first and second banks so that it leads to an intake passage in a throttle body; the inside of the intake air-dispensing box is divided by a partition wall into first and second dispensing chambers communicating with the intake air inlet; an on-off valve capable of permitting the first and second dispensing chambers to be put into and out of communication with each other is mounted in the partition wall; and first and second intake branch pipes opening into the first and second dispensing chambers respectively and leading to intake ports in the first and second banks respectively are connected to the intake air-dispensing box; wherein the intake air-dispensing box is comprised of a dispensing box body which includes the intake air inlet, the first and second intake branch pipes and one of halves of the partition wall and which has an opening provided in its outer wall opposite from the first and second intake branch pipes to extend between the first and second dispensing chambers, and a lid made of a light alloy by casting and having the other half of the partition wall, and a valve bore permitting the first and second dispensing chambers to be put into communication with each other and bearing bores for supporting a valve shaft of the on-off valve for opening and closing the valve bore are defined in the other half of the partition wall; the bearing bores are made in the other half of the partition wall by drilling from a side opposite from the intake air inlet and disposed offset from a lengthwise central portion of the partition wall to a side of the partition wall opposite from the intake air inlet; and an actuator connected to the valve shaft to open and close the on-off valve is mounted at the other end of the intake air-dispensing box opposite from the intake air inlet.

The first and second banks correspond to left and right banks in an embodiment of the present invention which will be described hereinafter.

With the sixth feature, a single assembly is formed by the lid and the on-off valve and hence, the maintenance of the on-off valve and the members around the on-off valve can be carried out easily by removing the lid from the dispensing box body, thereby contributing to an enhancement in maintenance property.

Moreover, the lid made of the light alloy by casting is small in size and simple in shape, as compared with the dispensing box body integral with the intake branch pipes and hence, can be precisely formed by casting such as high-pressure die-casting. Therefore, the post-processing of the valve bore is not required and moreover, the lid having a high rigidity and such a high quality that deformation cannot be generated therein even due to a change in the surrounding temperature, can be produced easily, and the good opening and closing operation of the on-off valve supported on the lid can be always ensured irrespective of the change in the surrounding temperature.

Moreover, the intake air inlet and the actuator are disposed at opposite ends of the intake air-dispensing box and hence, it is possible to avoid the interference of the valve shaft supporting the on-off valve and the intake air inlet with each other to provide a reduction in span of the valve shaft. Furthermore, since the bearing bores supporting the valve shaft are disposed in the offset manner as described above, they can be made easily and with a high accuracy by a relatively short drill.

According to a seventh aspect and feature of the present invention, in addition to the sixth feature, a plurality of the valve bores opened and closed by a plurality of the on-off valves and at least three bearing bores coaxially arranged with the valve bores interposed therebetween are made in the other half of the partition wall.

With the seventh feature, it is possible to simultaneously achieve the ensuring of a total wide opening area of the valve bores and the prevention of the flexure of the valve shaft.

According to an eighth aspect and feature of the present invention, in addition to the sixth or seventh feature, the other half of the partition wall is divided into a main partition other-half body and a partition piece so that the valve bore is divided along the bearing bores into halves, the partition piece being bolted to the main partition other-half body.

With the eighth feature, when the main partition other-half body and the partition piece of the partition wall are formed, the halves of the valve bore included respectively in the main partition other-half body and the partition piece can be die-formed simply, and after the casting, a troublesome processing for the valve bore is not required, leading to an enhancement in productivity.

According to a ninth aspect and feature of the present invention, in addition to the sixth feature, the intake air-dispensing box is disposed in a vertically longer shape between rearward-directed heads of the first and second banks of the engine for an outboard engine system with a crankshaft disposed vertically and a rear wall of an engine hood for the outboard engine system for covering the engine; the intake air inlet is provided in an upper end of the intake air-dispensing box; and the actuator is mounted at a lower end of the intake air-dispensing box.

With the ninth feature, in the outboard engine system, the intake system can be accommodated compactly in a narrow space between the first and second banks of the engine and the engine hood, while avoiding the interference of the intake air inlet and the actuator with each other.

According to a tenth aspect and feature of the present invention, there is provided an intake system for a multi-cylinder engine, in which an intake air inlet is provided in one end of an intake air-dispensing box disposed on one side of an engine having first and second banks so that it leads to an intake passage in a throttle body; the inside of the intake air-dispensing box is divided by a partition wall into first and second dispensing chambers communicating with the intake air inlet; an on-off valve capable of permitting the first and second dispensing chambers to be put into and out of communication with each other is mounted in the partition wall; and first and second intake branch pipes opening into the first and second dispensing chambers respectively and leading to intake ports in the first and second banks respectively are connected to the intake air-dispensing box; wherein the intake air-dispensing box is comprised of a dispensing box body which includes the intake air inlet, the first and second intake branch pipes and one of halves of the partition wall and which has an opening provided in its outer wall opposite from the first and second intake branch pipes to extend between the first and second dispensing chambers, and a lid which is made of a light alloy by casting and which has the other half of the partition wall and a loop-shaped surrounding wall integrally, projectingly provided on its inner surface and detachably coupled to an outer surface of the dispensing box body to surround the opening; a valve bore permitting the first and second dispensing chambers to be put into communication with each other and bearing bores supporting a valve shaft of the on-off valve for opening and closing the valve bore are provided in the other half; and an outward bulge is formed at a portion of the lid corresponding to the valve bore in order to enlarge the valve bore.

The first and second banks correspond to left and right banks 6L and 6R in the embodiment of the present invention which will be described hereinafter.

With the tenth feature, a single assembly is formed by the lid and the on-off valve and hence, the maintenance of the on-off valve and the members around the on-off valve can be carried out easily by removing the lid from the dispensing box body, thereby contributing to an enhancement in maintenance property.

Moreover, the lid made of the light alloy by casting can contribute to a reduction in weight of the intake air-dispensing box and maintain a predetermined shape without being influenced by a change in the surrounding temperature and moreover, is reinforced effectively by the surrounding wall on the inner surface. Therefore, the bearing bores for the valve shaft made in the other half of the partition wall integral with the lid cannot be deformed, whereby the stable operation of the on-off valve can be ensured. Further, the surrounding wall on the inner surface of the lid also serves to enlarge a runner during formation of the lid by casting to enhance the castability of the lid and hence, also contributes to an improvement in quality of the lid.

In addition, the outward bulge formed at the portion of the lid corresponding to the valve bore provides an increase in height of the other half of the partition wall at the bulge, whereby the valve bore having a large opening area can be formed, but also an increase in weight of the intake air-dispensing box can be provided by the outward bulge.

Particularly, the lid having the valve bore is small in size and simple in shape, as compared with the dispensing box body integral with the intake branch pipes and hence, can be precisely formed by casting such as high-pressure die-casting. Therefore, the post-processing of the valve bore is not required and moreover, the lid having a high rigidity and such a high quality that deformation cannot be generated therein even due to a change in the surrounding temperature, can be produced easily, and the good opening and closing operation of the on-off valve supported on the lid can be always ensured irrespective of the change in the surrounding temperature.

According to an eleventh aspect and feature of the present invention, in addition to the tenth feature, the bearing bores are made in the other half of the partition wall from an end opposite from the intake air inlet.

With the eleventh feature, the bearing bores can be made easily and with a high accuracy by a relatively short drill to contribute to the stabilization of the operation of the on-off valve irrespective of the existence of the intake air inlet.

According to a twelfth aspect and feature of the present invention, in addition to the tenth or eleventh feature, the other half of the partition wall is divided into a main partition other-half body and a partition piece so that the valve bore is divided along the bearing bores into halves, the partition piece being bolted to the main partition other-half body.

With the twelfth feature, when the main partition other-half body and the partition piece of the partition wall are produced by casting, the halves of the valve bore included respectively in the main partition other-half body and the partition piece can be die-formed simply, and a troublesome processing for the valve bore is not required after the casting, leading to an enhancement in productivity.

According to a thirteenth aspect and feature of the present invention, in addition to the first feature, the intake air-dispensing box is disposed in a vertically longer shape between rearward-directed heads of the first and second banks of the engine for an outboard engine system with a crankshaft disposed vertically and a rear wall of an engine hood for the outboard engine system for covering the engine; the intake air inlet is provided in an upper end of the intake air-dispensing box; and the actuator for driving the on-off valve is mounted at a lower end of the intake air-dispensing box through the valve shaft.

With the thirteenth feature, in the outboard engine system, the intake system can be accommodated compactly in a narrow space between the first and second banks of the engine and the engine hood, while avoiding the interference of the intake air inlet and the actuator with each other.

According to a fourteenth aspect and feature of the present invention, in addition to any of the first, third, sixth and tenth features, the bearing bore rotatably supporting the valve shaft of the on-off valve and an annular seal housing adjoining an outer end of such bearing bore are defined in the intake air-dispensing box, and a seal member is mounted in the seal housing and has first and second lips protruding outwards and inwards of the intake air-dispensing box respectively to come into close contact with an outer peripheral surface of the valve shaft.

With the fourteenth feature, when a negative suction pressure is applied to the intake air-dispensing box, the outward-directed first lip of the seal member receives the negative pressure to increase a sealing force on the valve shaft. In addition, when a positive pressure is applied to the intake air-dispensing box due to the pulsation of intake air or an air blowing-back phenomenon, the inward-directed second lip of the seal member receives the positive pressure to increase the sealing force on the valve shaft. Therefore, it is possible to prevent external dust from entering the intake air-dispensing box through the bearing bores for the valve shaft and to prevent a blow-by gas in the intake air-dispensing box or an oil contained in the blow-by gas from being leaked to the outside, by the single seal member. In addition, it is not necessary to particularly increase a force of resilient contact of the each lip itself of the seal member with the valve shaft and hence, the frictional resistance against the rotation of the valve shaft due to the seal member can be suppressed to the minimum, and it is possible to contribute to a reduction in capacity of the actuator for operating the on-off valve.

According to a fifteenth aspect and feature of the present invention, in addition to the fourteenth feature, the seal housing with the seal member mounted therein is defined in a lower end wall of the intake air-dispensing box through which the valve shaft disposed substantially vertically extends.

With the fifteenth feature, when a layout, in which the valve shaft disposed substantially vertically extends through the lower end wall of the intake air-dispensing box, is employed, even if the oil in the blow-by gas is accumulated on a bottom in the intake air-dispensing box, such oil can be prevented reliably by the first and second lips of the seal member from being leaked out of the intake air-dispensing box due to its own weight.

The above and other objects, features and advantages of the invention will become apparent from the following detailed description of the preferred embodiment taken in conjunction with the accompanying drawings.

DESCRIPTION OF THE PREFERRED EMBODIMENT

The present invention will now be described by way of an embodiment with reference to the accompanying drawings.

In the description made below, the terms "front", "rear", "left" and "right" are referred to with respect to a hull H to which an outboard engine system O is mounted.

Figure 1:
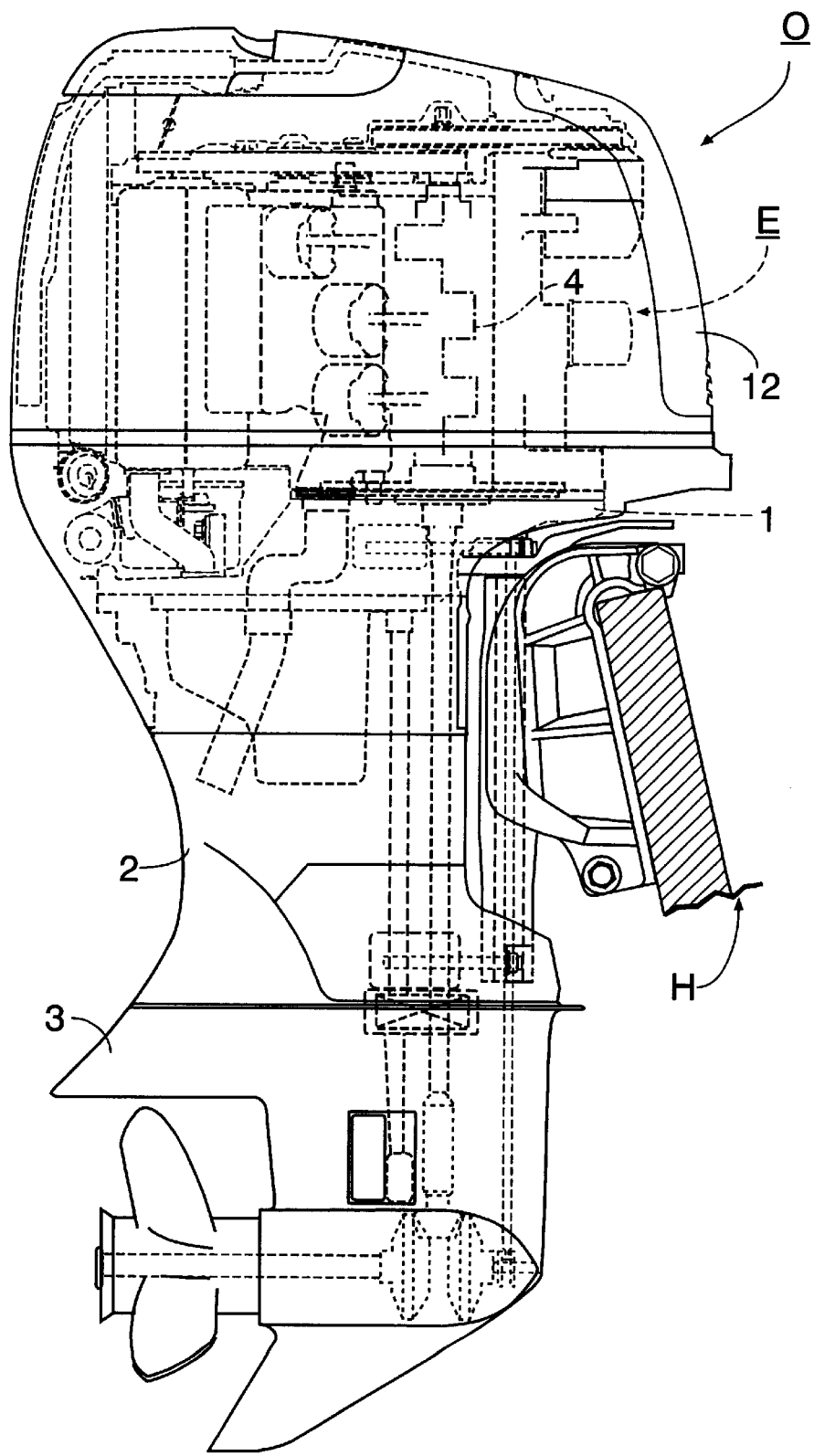
FIG. 1 is a side view of the entire arrangement of an outboard engine system.
Figure 2:
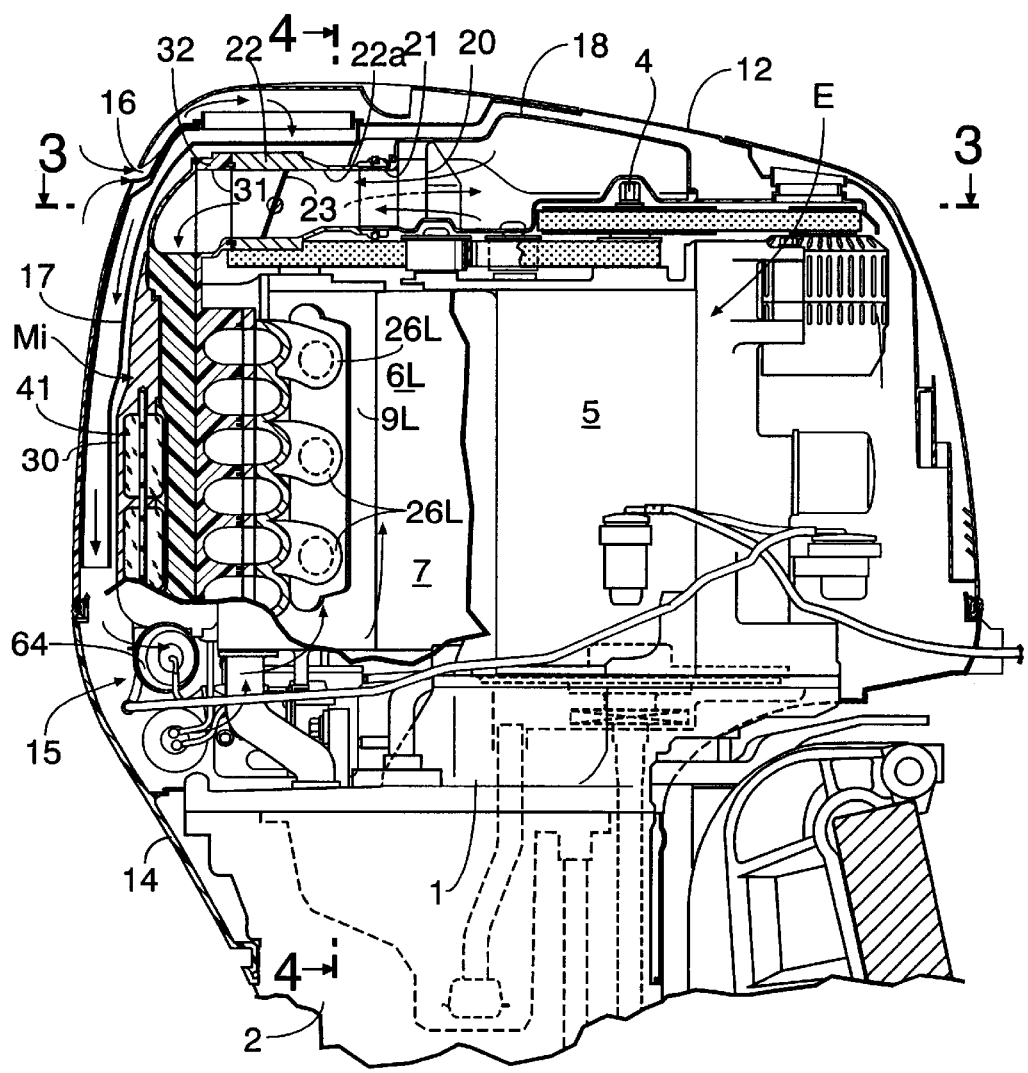
FIG. 2 is a vertical sectional view of essential portions of FIG. 2.
Figure 3:
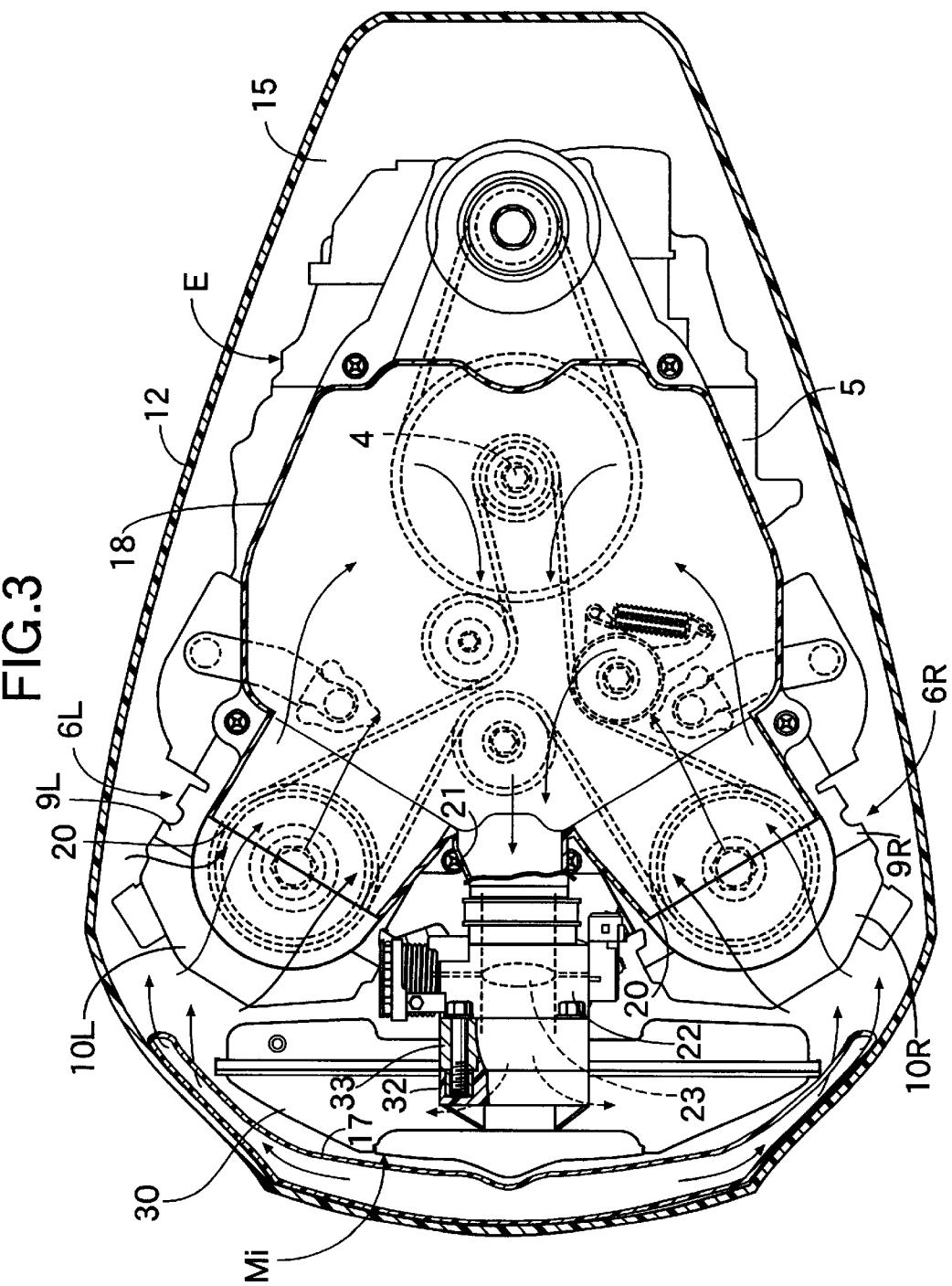
FIG. 3 is a sectional view taken along a line 3—3 in FIG. 2.

Referring first to FIGS. 1 to 3, an outboard engine system O mounted at a rear end of a hull H includes a mount case 1, an extension case 2 coupled to a lower end face of the mount case 1, and a gear case 3 coupled to a lower end face of the extension case 2. A V-type 6-cylinder and water-cooling 4-stroke engine E is mounted on an upper end face of the mount case 1 with a crankshaft 4 disposed vertically.

An annular undercover 14 is secured to the mount case 1 through a stay 13. The undercover 14 covers the periphery of a section extending from a lower portion of the engine E to an upper portion of the extension case 2, and an engine hood 12 is detachably mounted at an upper end of the undercover 14 to cover the engine E from above. An engine room 15 for accommodation of the engine E is defined by the engine hood 12 and the undercover 14.

The engine E includes a crankcase 5 for supporting the crankshaft 4 disposed vertically, and a pair of left and right banks 6L and 6R spreading into a V-shape in a rearward direction from the crankcase 5. A lower surface of the crankcase 5 is bolted to a mounting face of an upper portion of the mount case 1.

Figure 5:
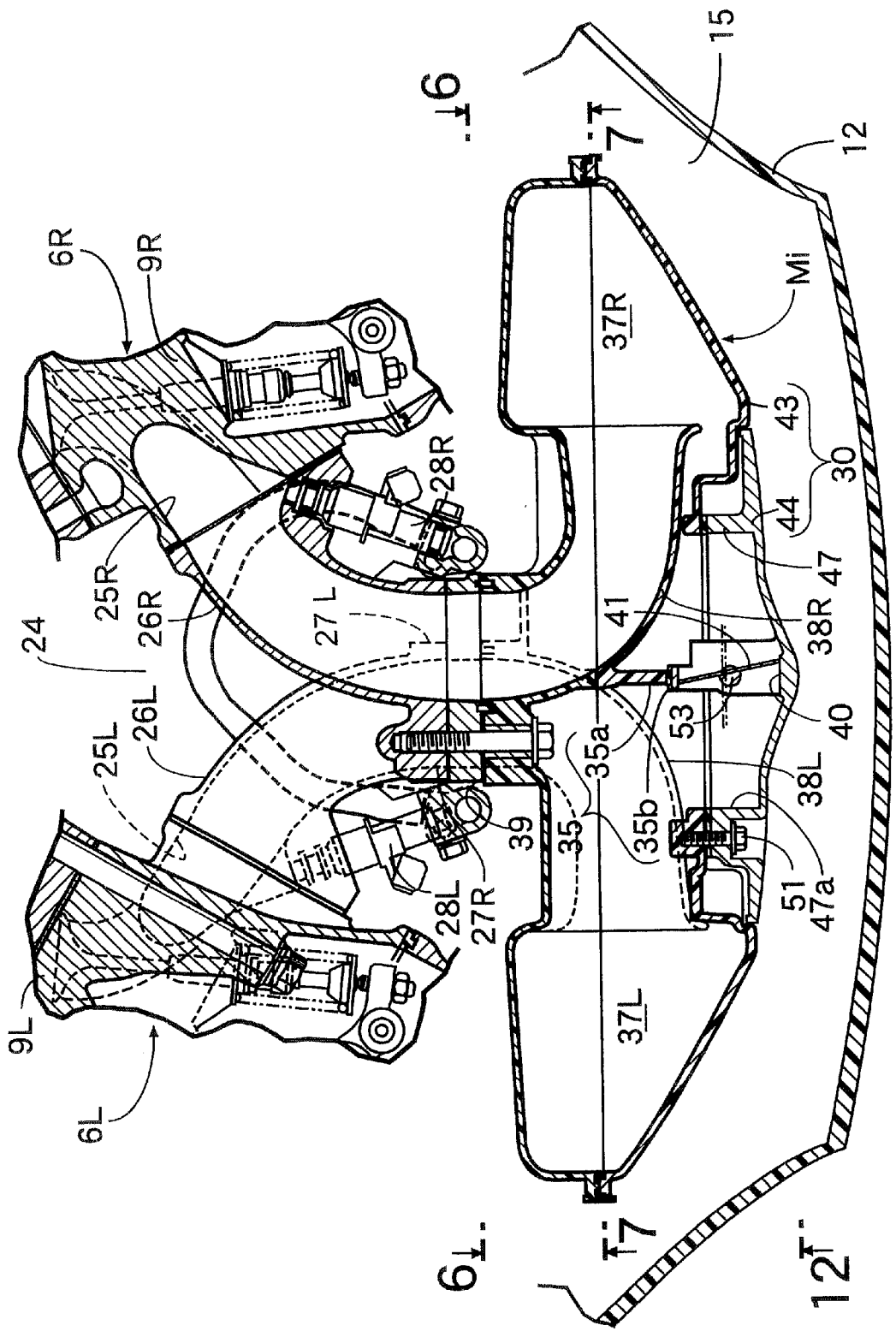
FIG. 5 is a sectional view taken along a line 5—5 in FIG. 4.
Figure 6:
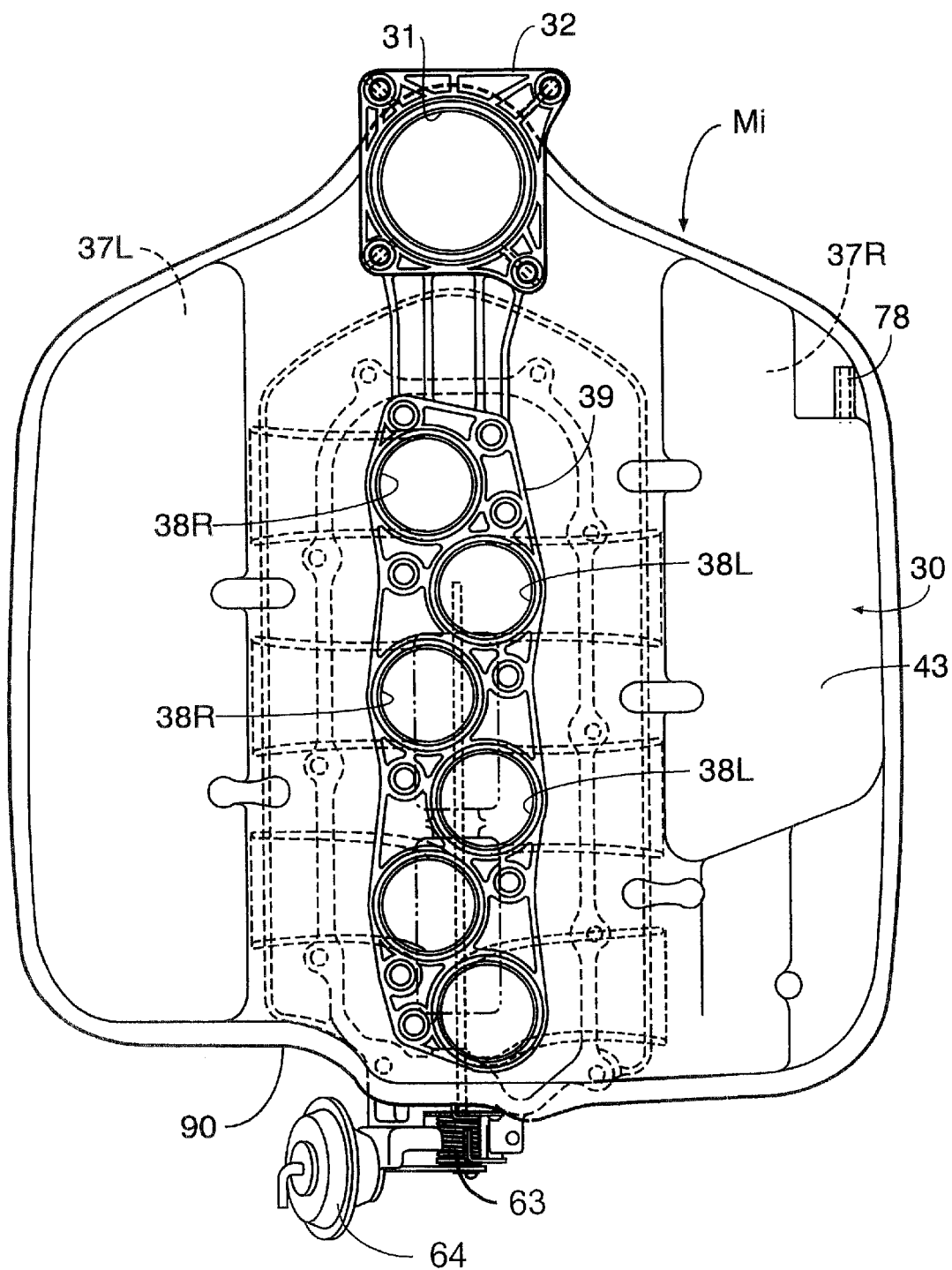
FIG. 6 is a sectional view taken along a line 6—6 in FIG. 5.

As shown in FIGS. 5 and 6, each of the banks 6L and 6R has a plurality of (three in the illustrated embodiment) cylinder bores 7L, 7R arranged vertically. The left and right banks 6L and 6R are comprised of a cylinder block 7 bolted to a rear end face of the crankcase 5 and having the cylinder bores 28L and 28R, a pair of cylinder heads 9L and 9R bolted to left and right rear end faces of the cylinder block 7, into which the cylinder bores 7L and 7R open, respectively, and a pair of head covers 10L and 10R coupled to rear end faces of the cylinder heads 9L and 9R to close valve-operating chambers defined in the cylinder heads 9L and 9R.

Figure 4:
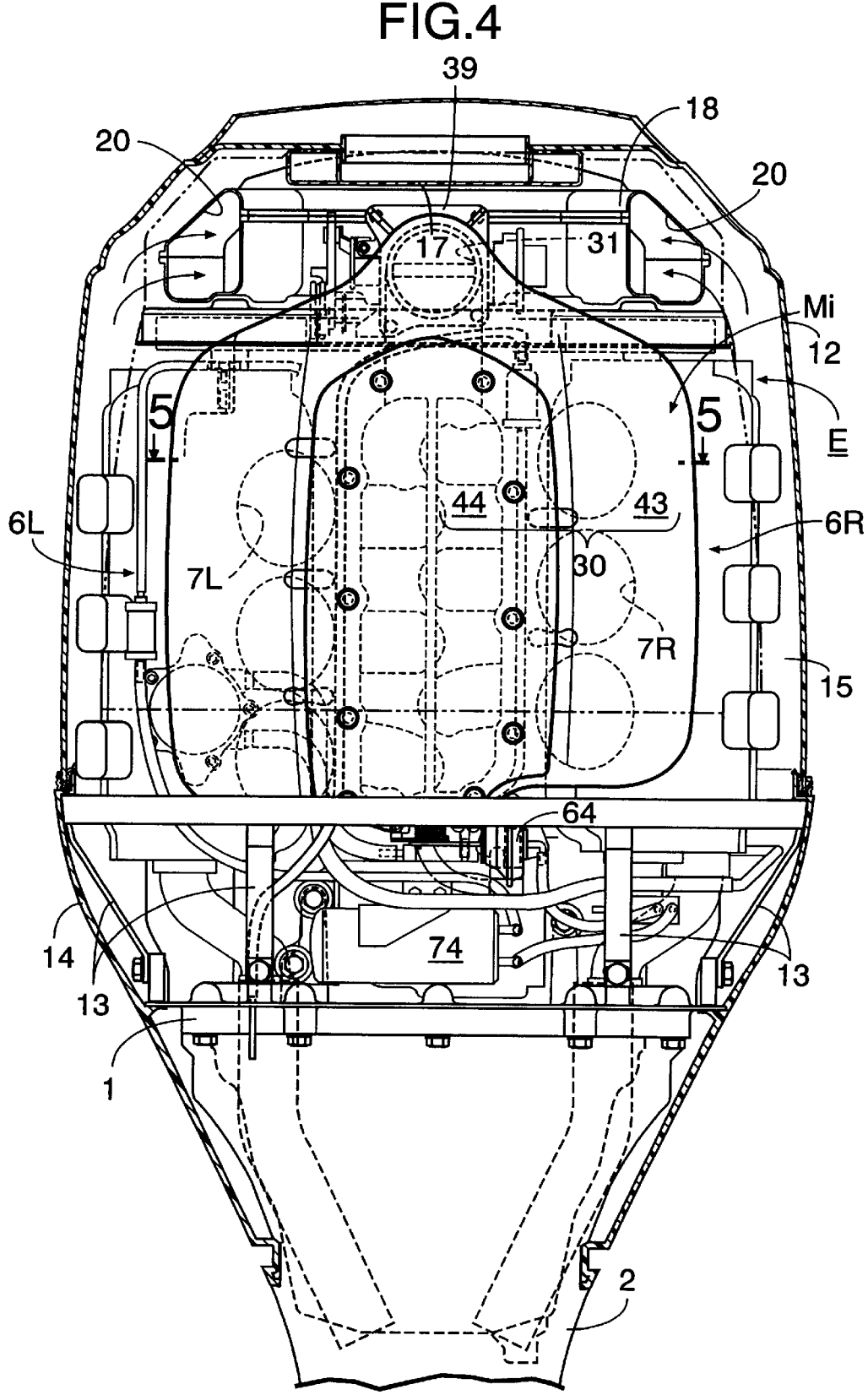
FIG. 4 is a sectional view taken along a line 4—4 in FIG. 2.

Referring to FIGS. 2 to 4, an air intake port 16 is provided in an upper portion of a rear surface of the engine hood 12, and a flat ventilating duct 17 is disposed along an inner surface of a rear wall of the engine hood 12 to communicate with the air intake port 16, so that its lower end opens into a lower portion of the engine room 15. Air introduced into the engine room 15 through the ventilating duct 17 is drawn through an intake silencer 18 and an intake manifold Mi into the left and right banks 6L and 6R.

The intake silencer 18 is mounted on an upper surface of the engine E and has a box shape. The intake silencer 18 includes a pair of left and right inlets 20, 20 and an outlet 21 disposed between the inlets 20, 20. An intake passage 22a in a throttle body 22 is connected at its upstream end to the outlet 21. A throttle valve 23 is supported in the intake passage 22a and operable in association with an accelerator lever (not shown) mounted on the hull H.

Figure 7:
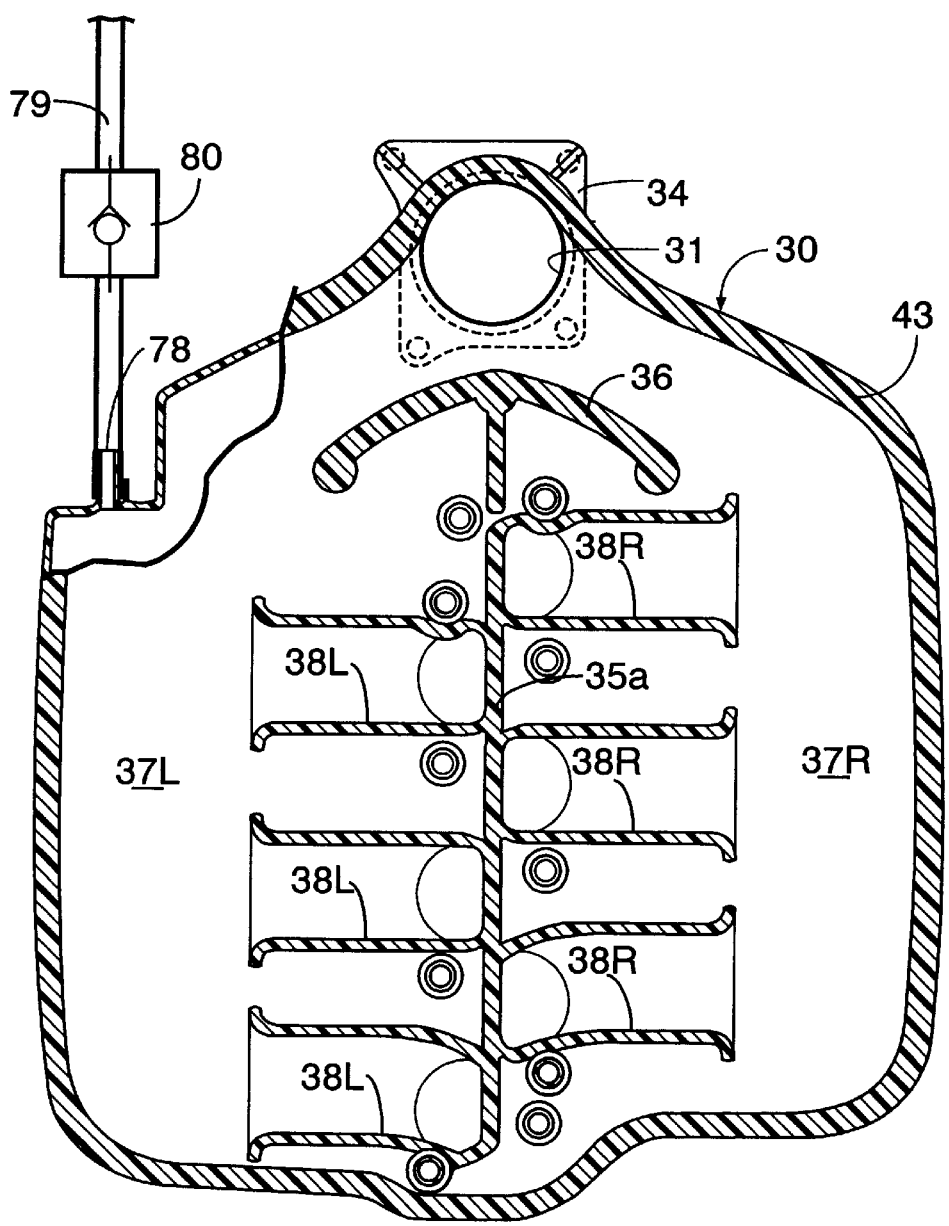
FIG. 7 is a sectional view taken along a line 7—7 in FIG. 5.
Figure 8:
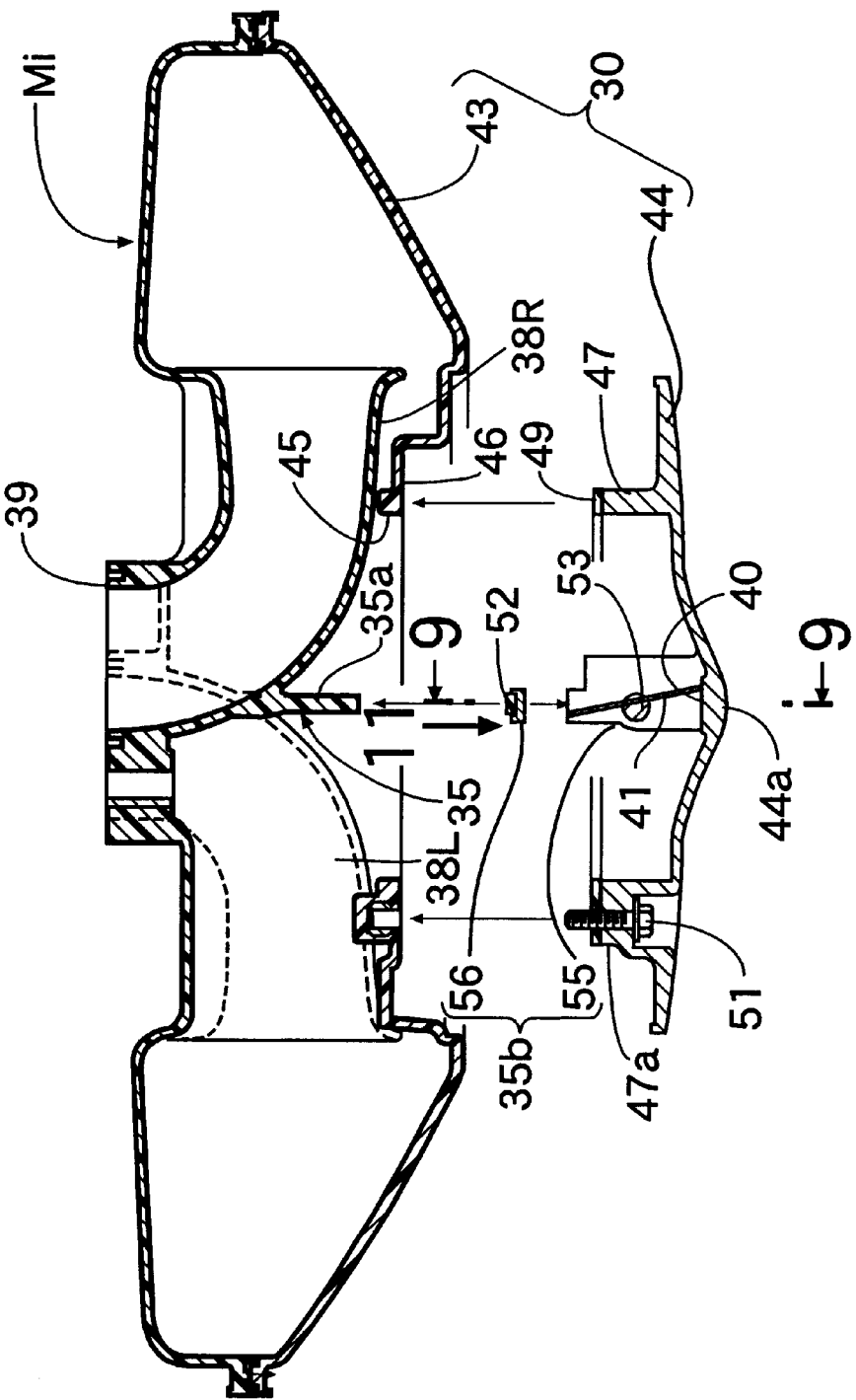
FIG. 8 is an exploded perspective view similar to FIG. 5, but showing essential portions of an intake manifold.

Referring to FIGS. 5 to 7, the manifold Mi connected to a downstream end of the intake passage 22a in the throttle body 22 is disposed to face a valley 24 between the left and right banks 6L and 6R. A plurality of left intake pipes 26L and a plurality of right intake pipes 26R are disposed in the valley 24 with their upstream ends turned rearwards. The left intake pipes 26L are connected to a plurality of intake ports 25L provided in the cylinder head 9L of the left bank 6L, and the right intake pipes 26R are connected to a plurality of intake ports 25R defined in the cylinder head 9R of the right bank 6R. A left connecting flange 27L is integrally formed at upstream ends of the plurality of left intake pipes 26L to connect them to one another, and a right connecting flange 27R is integrally formed at upstream ends of the plurality of right intake pipes 26R to connect them to one another. Electromagnetic fuel injection valves 28L and 28R are mounted to the intake pipes 26L and 26R of the left and right banks 6L and 6R for injecting fuel toward the corresponding banks 6L and 6R, respectively.

The intake manifold Mi includes an intake air-dispending box 30 having such a shape that it is prolonged vertically and flat in a longitudinal direction. The intake air-dispensing box 30 is disposed astride rear surfaces of the left and right banks 6L and 6R. A connecting flange 32 having an intake air inlet 31 at its central portion is formed at an upper portion of a front wall of the intake air-dispending box 30, and a connecting flange 33 formed at a downstream end of the throttle body 22 is coupled to the connecting flange 32.

A partition wall 35 is mounted within the intake air-dispensing box 30, and the inside of the intake air-dispensing box 30 is divided by the partition wall 35 into a left dispensing chamber 37L and a right dispensing chamber 37R communicating with the intake air inlet 31. A guide wall 36 for diverting the air entering the intake air inlet 31 into the dispensing chambers 37L and 37R is connected to the partition wall 35.

A plurality of left intake branch pipes 38L and a plurality of right intake branch pipes 38R are integrally formed on a front wall of the intake air-dispensing box 30 to communicate with the left and right dispensing chambers 37L and 37R, respectively. A single connecting flange 39 is integrally formed at downstream ends of the left and right intake branch pipes 38L and 38R to connect them to one another. The left and right intake branch pipes 38L and 38R are bolted to the connecting flanges 27L and 27R of the left and right intake pipes 26L and 26R.

A pair of left and right valve bores 40 are provided in the partition wall 35 dividing the inside of the intake air-dispensing box 30 into the left and right dispensing chambers 37L and 37R, so that they permit the dispensing chambers 37L and 37R to communicate directly with each other, and a pair of butterfly on-off valves 41 for opening and closing the valve bores 40 are supported on the partition wall 35.

Thus, flows of air entering the left and right inlets 20, 20 in the intake silencer 18 are joined together in the intake silencer 18, and the resulting air exits the outlet 21 and flows through the intake passage 22a in the throttle body 22 toward the intake air inlet 31 in the intake air-dispensing box 30 of the intake manifold Mi. During this process, the amount of air drawn into the engine E is controlled in the intake passage 22a in accordance with the opening degree of the throttle valve 23.

In a low-speed operation range of the engine E, the on-off valves 41 within the intake air-dispensing box 30 are in closed states, and the air flowing into the intake air inlet 31 in the intake manifold Mi is diverted into the left and right dispensing chambers 37L and 37R extending vertically. The air diverted into the left dispensing chamber 37L is further diverted into the plurality of left intake branch pipes 38L and passed via the left intake pipes 26L through the intake ports 25L in the left bank 6L into the corresponding cylinder bores 27L. The air diverted into the right dispensing chamber 37R is further diverted into the plurality of right intake branch pipes 38R and passed via the right intake pipes 26R through the intake ports 25R in the right bank 6R into the corresponding cylinder bores 27R.

In the low-speed operational range of the engine E, the left and right dispensing chambers 37L and 37R, into which upstream ends of the left and right intake branch pipes 38L and 38R open, excluding portions communicating with the intake air inlet 31, are disconnected from each other by the on-off valve 41 which is in the closed state. Therefore, two resonant supercharging intake systems causing no air-drawing interference with each other are formed, which comprise an intake system extending from the left dispensing chamber 37L to the intake port 25L in the left bank 6L and an intake system extending from the right dispensing chamber 37R to the intake port 25R in the right bank 6R. Moreover, the natural vibration of each of the resonant supercharging intake systems is set to substantially accord with the opening/closing cycle of the intake valve in each of the banks 6L and 6R in the low-speed operational range of the engine E. Therefore, a resonant supercharging effect can be exhibited effectively, thereby increasing the intake air charging efficiency in the low-speed operational range of the engine and providing an enhancement in output performance.

In a high-speed operational range of the engine E, the on-off valve 41 within the intake air-dispensing box 30 is opened, whereby the left and right dispensing chambers 37L and 37R communicate with each other through the valve bore 40 to constitute a single surge tank having a large capacity. Upstream ends of the left and right intake branch pipes 38L and 38R open into the surge tank and hence, the capacity of air intake inertia in each of the banks 6L and 6R is increased, and the substantial length of the resonant charging system is reduced, whereby the natural vibration of the resonant charging system in the high-speed operational range of the engine E is increased to accord with the opening/closing cycle of the intake valve in each of the banks 6L and 6R. Thus, a resonant supercharging effect can be exhibited effectively, thereby increasing the intake air charging efficiency in the high-speed operational range of the engine E and providing an enhancement in output performance.

As shown in FIGS. 5 to 8, the intake air-dispensing box 30 is comprised of a dispensing box body 43 made of a synthetic resin, and a lid 44 made of a light alloy such as an aluminum alloy and an Mg alloy by high-pressure die-casting. The dispensing box body 43 is formed integrally with the connecting flange 32, the left and right intake branch pipes 38L and 38R and one 35a of halves of the partition wall 35, and has an opening 45 provided in its rear wall opposite from the left and right intake branch pipes 38L and 38R to open into the left and right intake branch pipes 38L and 38R. A connecting flange 46 directed inwards is mounted in the periphery of the opening 45. The lid 44 closes the opening 45, and a loop-shaped surrounding wall 47 opposed to the connecting flange 46 to surround the opening 45 and the other half 35b of the partition wall 35 are integrally formed on an inner surface of the lid 44. The surrounding wall 47 has a plurality of mounting bosses 47a formed thereon. The surrounding wall 47 is superposed on the connecting flange 46 with a seal member 49 interposed therebetween, and the connecting flange 46 is coupled to the mounting bosses 47a by a bolt 51, whereby the opening 45 is closed air-tightly. In this case, a seal member 52 is also interposed between the one half 35a and the other half 35b of the partition wall 35.

The pair of upper and lower valve bores 40 and the pair of upper and lower on-off valves 41 are provided in the other half 35b of the partition wall 35. Each of the valve bores 40 is formed into an oblong shape with longer sides directed vertically, and correspondingly, each of the on-off valves is formed into an oblong shape. The pair of upper and lower on-off valves 41 are mounted to a common single valve shaft 53 extending vertically, and the valve shaft 53 is rotatably supported at its opposite ends and its intermediate portion in three coaxial bearing bores 54a, 54b and 54c made by drilling in the other half 35b of the partition wall 35 from a lower end face of the lid 44.

Both the valve bores 40 are disposed entirely offset from a longitudinally central portion of the partition wall 35 to a lower end of the partition wall 35, which is a starting end of working or drilling for the bearing bores 54a, 54b and 54c. If the valve bores 40 are disposed as described above, the span of the valve shaft 53 can be set at a minimum length required only to support the on-off valves 41, and to make the bearing bores 54a, 54b and 54c, a relatively short drill can be used. The working accuracy for the bearing bores 54a, 54b and 54c can be increased easily without need for a high-level skill. The starting end of working or drilling for the bearing bores 54a, 54b and 54c is located on the side opposite from the intake air inlet 31 and hence, the bearing bores 54a, 54b and 54c can be made easily and at a high accuracy by the relatively short drill irrespective of the existence of the intake air inlet 31.

In this manner, the on-off valves 41 ate supported on the other partition half 35b integral with the lid plate 44 and hence, the intake air-dispensing box 30 having the one-off valves 41 can be assembled by constituting an assembly of the lid plate 44 and the on-off valve 41 and then securing the lid plate 44 to the intake air-dispensing box 30. The loop-shaped surrounding wall 47 on the inner surface of the lid 44 coupled to the connecting flange 46 of the intake air-dispensing box 30 also functions as a reinforcing rib for increasing the rigidity of the lid 44 by cooperation with the other partition half 35b, while ensuring a necessary capacity of the intake air-dispensing box 30. This can contribute to a reduction in wall thickness of the lid 44 and in its turn to a reduction in weight of the lid 44, while preventing the warp of the lid 44 after being formed and the deformation due to the clamping force of the bolt on the intake air-dispensing box 30.

Specifically, the lid 44 having the valve bores 40 is small in size and simple in shape, as compared with the dispensing box body 43 integral with the intake branch pipes 38L and 38R and hence, can be precisely formed by casting such as high-pressure die-casting. Therefore, the post-processing of the valve bores 40 is not required and moreover, the lid 44 having such a high quality that deformation cannot be generated therein even due to a change in the surrounding temperature, can be produced easily.

In addition, the lid 44 is reinforced effectively by the surrounding wall 47 on the inner surface thereof and hence, particularly, the deformation of the bearing bores 54a, 54b and 54c made in the other partition wall 35b integral with the lid 44 cannot be brought about, and the on-off valves 41 with the valve shaft 53 supported in the bearing bores 54a, 54b and 54c can be opened and closed always smoothly, irrespective of the change in the surrounding temperature. Further, the surrounding wall 47 on the inner surface of the lid 44 also serves to enlarge the runner during casting of the lid 44 to enhance the castability of the lid 44, which also can contribute to improvement in quality of the lid 44.

An outward bulge 44a is formed on a portion of an outer wall of the lid 44, which corresponds to the valve bores 40, and the height of the other partition half 35b at the bulge 44a can be increased by the formation of the bulge 44a, whereby the valve bores 40 each having an opening area can be formed. In addition, it is possible to provide an increase in capacity of the intake air-dispensing box 30 by the bulge 44a.

Figure 12:
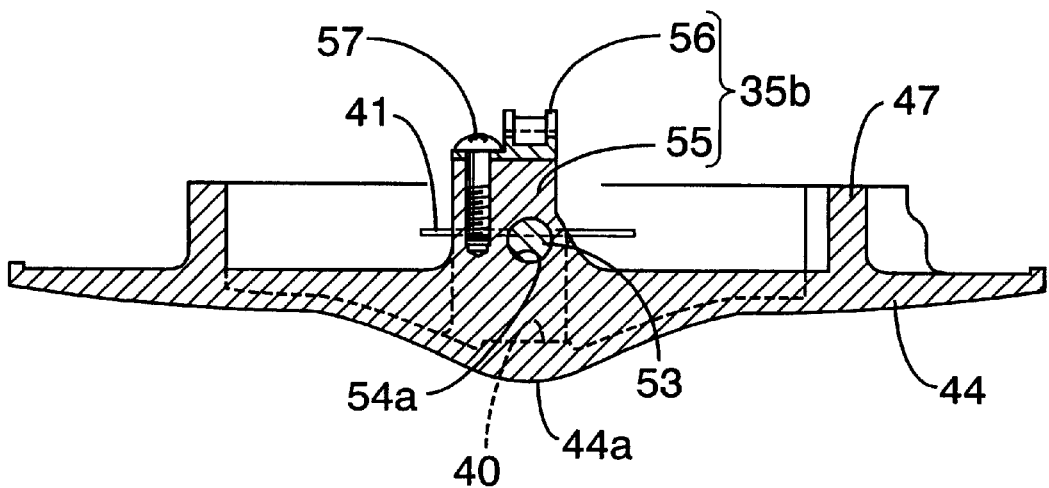
FIG. 12 is a sectional view taken along a line 12—12 in FIG. 11.

Further, in order to enable the valve bores 40 to be die-formed, the other partition half 35b is divided into a main partition other-half body 55 and a partition wall piece 56, so that the valve bores 40 are separated from each other along the bearing bores 54a, 54b and 54c. Each of the valve bores 40 is comprised of a relatively deep notch 40a formed in the main partition other-half body 55, and a relatively shallow notch 40b formed in the partition wall piece 56. The partition wall piece 56 is coupled at its opposite ends to the main partition other-half body 55 by bolts 57 (see FIG. 12).

The notches 40a and 40b can be die-formed simply during formation of the main partition other-half portion 55 and the partition piece 56 by casting and hence, a troublesome working of the valve bores is not required after the casting, leading to an enhancement in productivity. In addition, the plurality of valve bores 40 are mounted, and the valve shaft 53 common to the plurality of on-off valves 41 for opening the closing the valve bores 40 is supported at its opposite ends and its intermediate portion in the plurality of bearing bores 54a, 54b and 54c in the other partition half 35b and hence, the flexing of the valve shaft 53 can be prevented, while setting the total opening area of the valve bores 40 at a large value, thereby ensuring the smooth opening/closing operation of the on-off valves 41.

Referring to FIGS. 9 and 11 to 13, the lower end of the valve shaft 53 protrudes below the lid 44, and an operating lever 60 is secured to such lower end. The operating lever 60 includes three arms 60a, 60b and 60c disposed at locations circumferentially spaced apart from one another, so that the fully opened positions of the on-off valves 41 are defined by abutment of the first arm 60a against a stopper projection 61 formed on a lower end face of the lid 44, and the fully closed positions of the on-off valves 41 are defined by abutment of the second arm 60b against a stopper bolt 62 adjustably, threadedly engaged in the stopper projection 61. A valve spring 63 for biasing the on-off valves 41 in an opening direction is connected to the operating lever 60.

An operating rod 65 of a negative pressure actuator 64 is connected to the third arm 60c. The negative pressure actuator 64 includes a casing 66 supported on a bracket 67 screwed into the lower surface of the lid 44, and a diaphragm 71 coupled at its outer peripheral edge to the casing 66 and dividing the inside of the casing 66 into an atmospheric chamber 69 and an operating chamber 70. The operating rod 65 pivotably connected to the third arm 60c through the atmospheric chamber 69 is secured to a central portion of the diaphragm 71. A return spring 72 for biasing the diaphragm 71 in the direction to open the on-off valves 41 is accommodated in the operating chamber 70.

A negative pressure introduction pipe 73 is projectingly provided on the casing 66 of the negative actuator 64 to lead to the negative pressure chamber, and a control valve 76 is incorporated in the middle of a negative pressure conduit 75 connecting the negative pressure introduction pipe 73 and a negative pressure tank 74 to each other. The control valve 76 is a solenoid valve and is adapted to be excited in the low-speed operational range of the engine E to bring the negative pressure conduit 75 into a conduction state and to be deexcited in the high-speed operational range of the engine E to bring the negative pressure conduit 75 into a blocked state and to release the negative pressure chamber in the negative pressure actuator 64 to the atmospheric air by controlling an electronic control unit (not shown). Therefore, in the low-speed operational range of the engine E, the negative pressure actuator 64 is operated to close the on-off valves 41, and when the engine E is brought into the high-sped operational range, the negative pressure actuator 64 is brought into an inoperative state and hence, the on-off valves 75 are opened by a biasing force of the return spring 63.

A negative pressure conduit 79 leading to a negative pressure take-out pipe 78 formed at an upper portion of the intake air-dispensing box 30 is connected to the negative pressure tank 74, and a check valve 80 for inhibiting the back flow of a negative pressure from the negative pressure tank 74 to the negative pressure take-out pipe 78 is incorporated in the middle of the negative pressure conduit 79. Therefore, during operation of the engine E, a negative suction pressure generated in the intake air-dispensing box 30 can be passed through the negative pressure conduit 79 and the check valve 80 and stored in the negative pressure tank 74.

Figure 9:
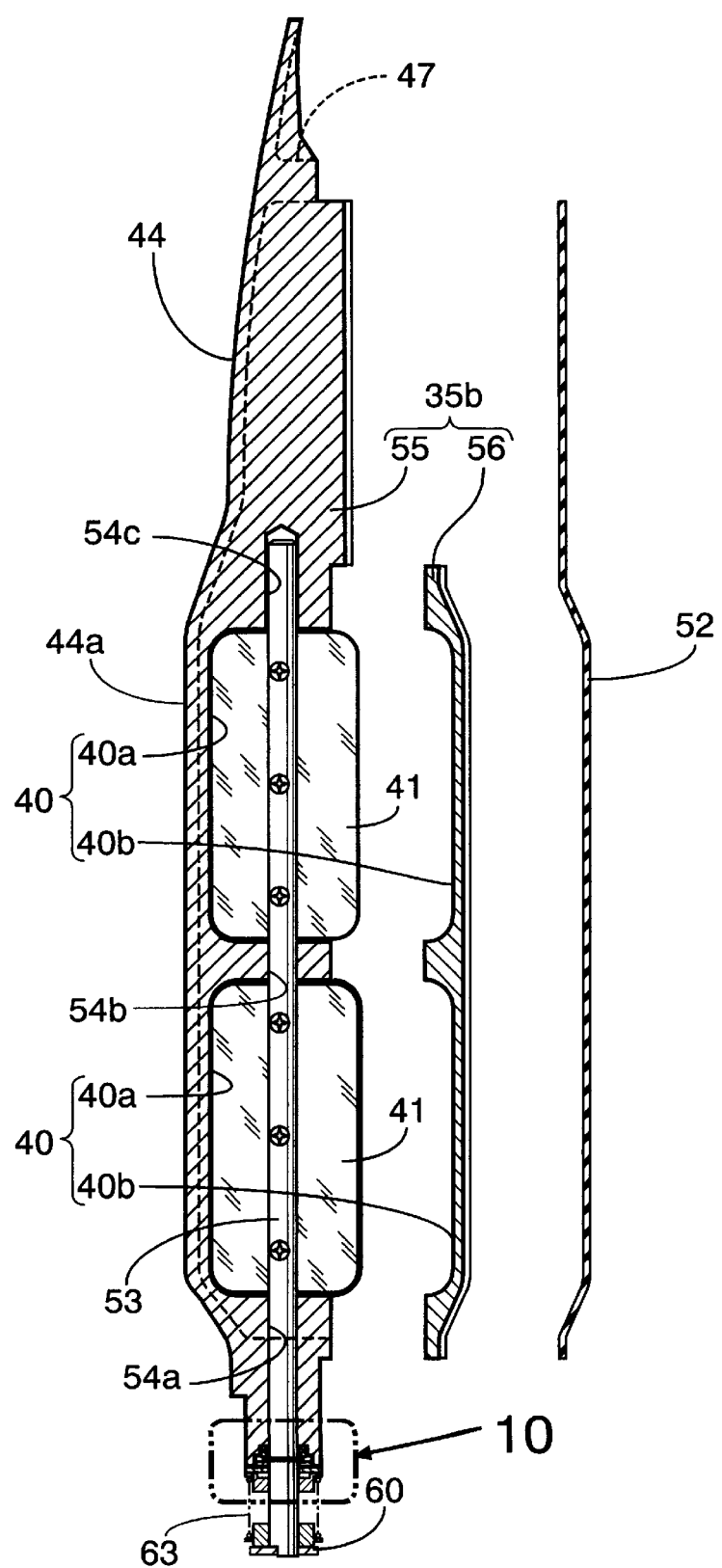
FIG. 9 is a sectional view taken along a line 9—9 in FIG. 8.
Figure 10:
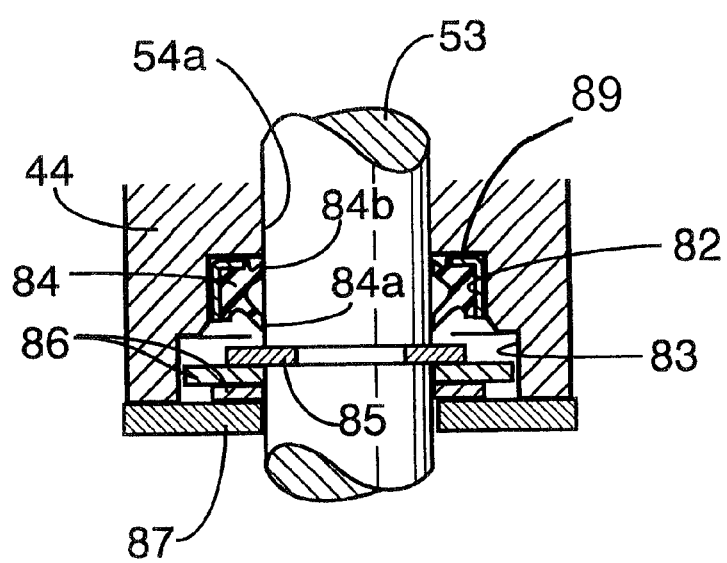
FIG. 10 is an enlarged view of a portion indicated by 10 in FIG. 9.

As shown in FIGS. 9 and 10, an annular seal housing 82 adjoining an outer end of the lowermost bearing bore 22a and a washer housing 83 adjoining an outer end of the seal housing 82 are defined in the lower end face of the lid 44. An annular seal member 84 is mounted in the seal housing 82. Accommodated in the washer housing 83 are a clip 85 locked to an outer periphery of the valve shaft 53 and opposed to an outer end face of the seal member 84, and a single or a plurality of washers 86 put rotatably and slidably into abutment against the clip 85. A retaining plate 87 for inhibiting the fall-off of the washer or washers 86 is screw-secured to the lower surface of the lid 44. The seal member 84 is made of an elastic material such as a rubber, and has first and second lips 85a and 84b integrally provided on its inner peripheral surface to protrude outwards and inwards of the intake air-dispensing box 30 respectively and come into close contact with the outer peripheral surface of the valve shaft 53, and a reinforcing ring 89 made of a metal is press-fitted to an inner peripheral surface of the seal housing 82 and baked thereto.

Thus, when a negative suction pressure is applied to the intake air-dispensing box 30 during operation of the engine E, the outward-directed first lip 84a of the seal member 84 receives the negative pressure to increase a close contact force, i.e., a sealing force on the valve shaft 53 and hence, it is possible to prevent external dust to be drawn through the lowermost bearing bore 54a into the intake air-dispensing box 30. If a positive pressure is applied to the inside of the intake air-dispensing box 30 during occurrence of the pulsation of intake air or an air blowing-back phenomenon, the inward-directed second lip 84b of the seal member 84 receives the positive pressure to increase the close contact force, i.e., the sealing force on the valve shaft 53 and hence, it is possible to prevent a blow-by gas, an oil contained in the blow-by gas and the like to be leaked through the lowermost bearing bore 54a to the outside of the intake air-dispensing box 30. Therefore, it is possible to prevent the entering of dust into the intake air-dispensing box 30 and the leakage of the blow-by gas and the like out of the intake air-dispensing box 30. In addition, it is not necessary to specially increase the force of resilient close contact of the first and second lips 84a and 84b themselves of the seal member 84 with the valve shaft 53 and hence, the frictional resistance against the rotation of the valve shaft due to the seal member 84 can be suppressed to the minimum, and it is possible to contribute to a reduction in capacity of the actuator 64 for operating the on-off valves 41.

Particularly, when a layout in which the valve shaft 53 disposed substantially vertically extends through the lower end wall of the intake air-dispensing box 30 is employed as in the illustrated embodiment, even if the oil in the blow-by gas is accumulated on the bottom in the intake air-dispensing box 30, the oil can be prevented reliably by the first and second lips 84a and 84b of the seal member from being leaked due to its won weight out of the intake air-dispensing box 30.

Figure 11:
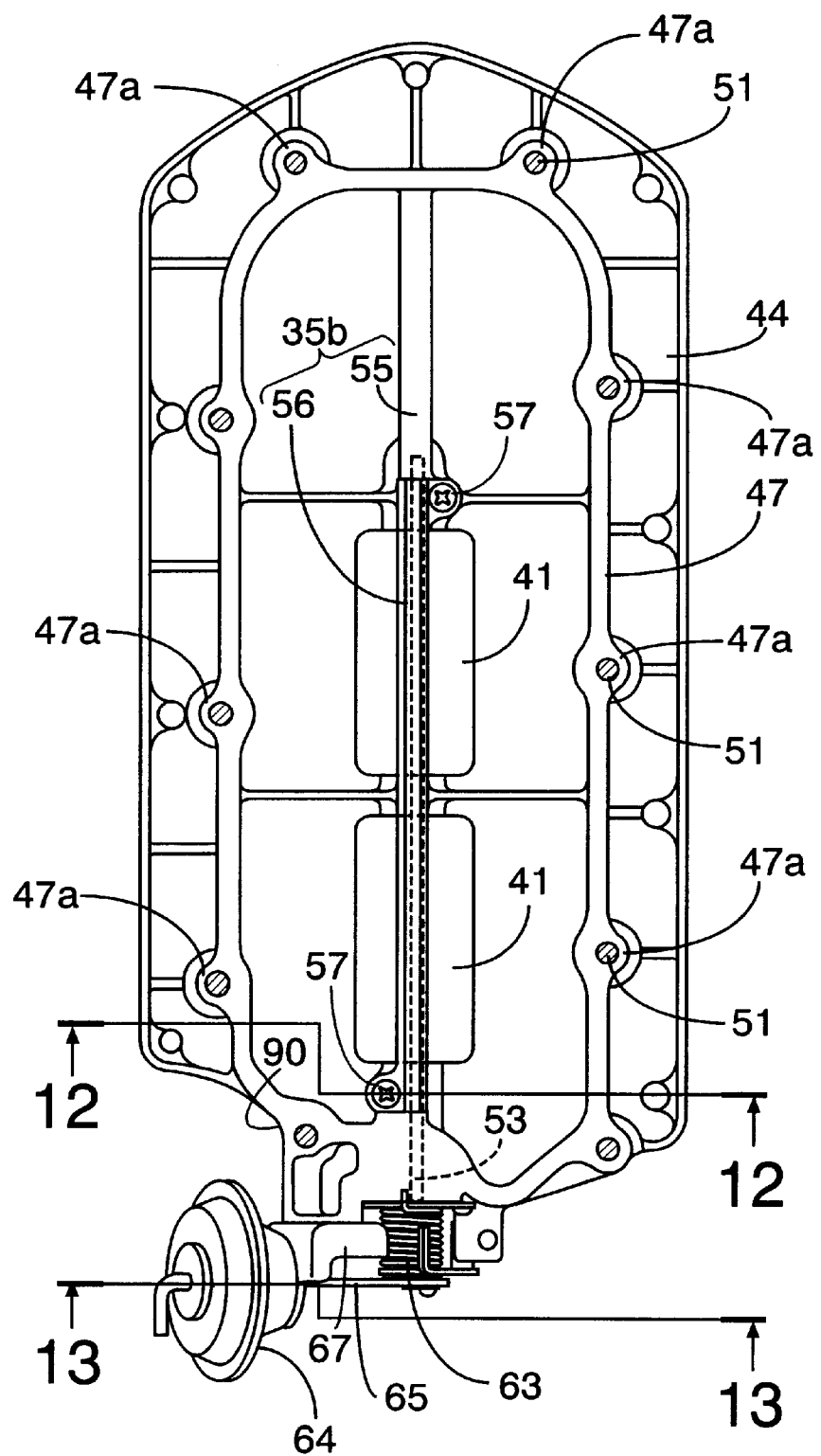
FIG. 11 is a view taken in a direction of an arrow 11 in FIG. 8.
Figure 13:
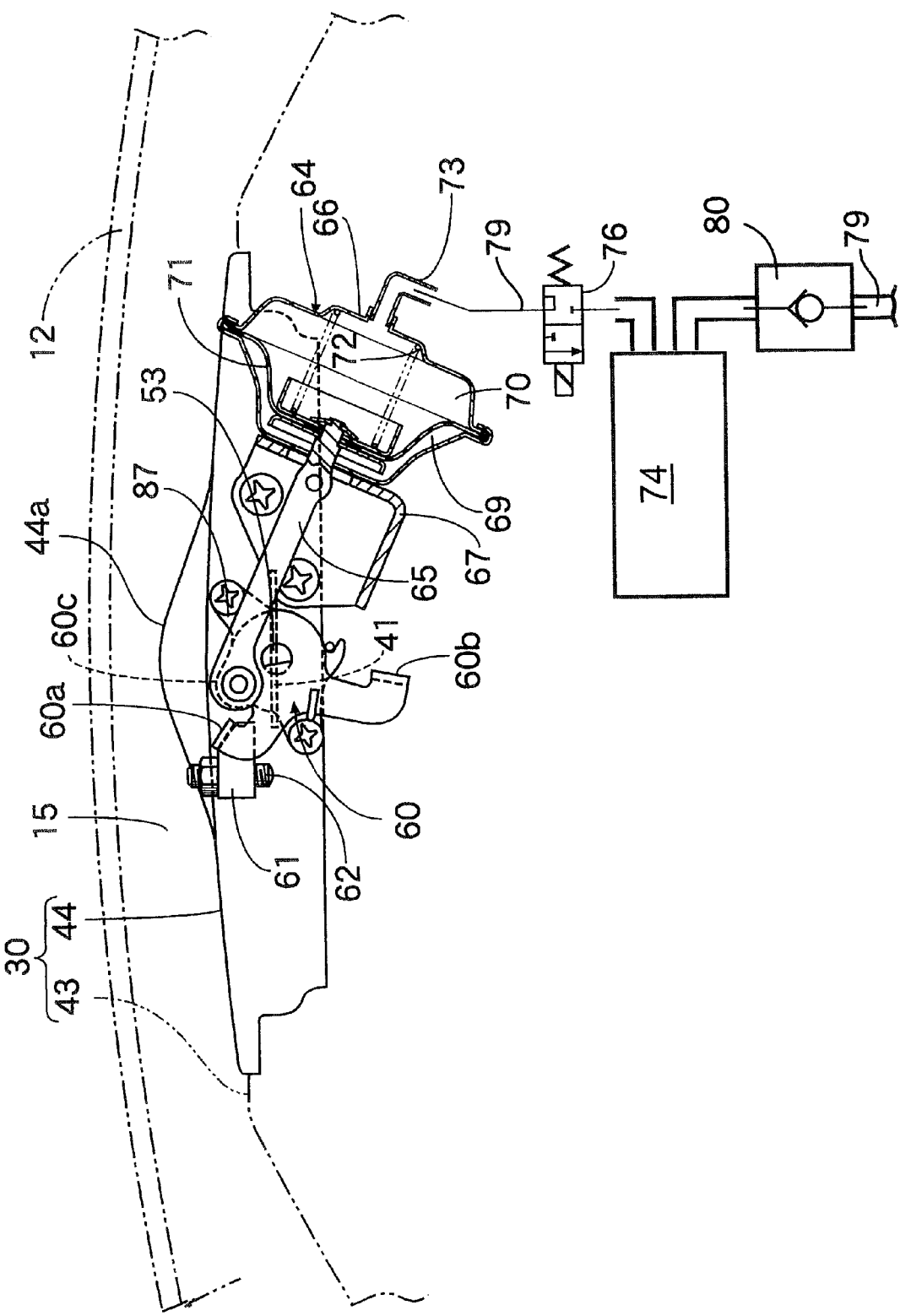
FIG. 13 is a sectional view taken along a line 13—13 in FIG. 11.

As shown in FIG. 13, the actuator 64 is disposed so that it is accommodated within a downward projected view of the intake air-dispensing box 30. In this case, a recess 90 for receiving an upper portion of the actuator 64 is defined in a lower surface of the intake air-dispensing box 30 as shown in FIGS. 6 and 11 in order to avoid the interference of the actuator 64 with the intake air-dispensing box 30.

Thus, the position of the actuator 64 for opening and closing the on-off valves 41 can be determined freely around the valve shaft 53 depending on the selection of the position of operating lever 60 coupled to the valve shaft 53 of the on-off valves 41. Therefore, the actuator 64 can be accommodated within an area of the vertically projected view of the intake air-dispensing box 30 only by inclining the actuator 64 forwards and hence, it is possible to simply avoid the interference of the actuator with the rear wall of the engine hood 12 mounted in proximity to the rear surface of the intake air-dispensing box 30. Moreover, the intake air inlet 31 and the actuator 64 are disposed at the vertically opposite ends of the intake air-dispensing box 30 and hence, it is also possible to avoid the interference of the intake air inlet 31 and the actuator 64 with each other to provide the compactness of the intake system. Furthermore, by receiving the upper portion of the actuator 64 in the recess 90 in the lower surface of the intake air-dispensing box 30, the actuator 64 of a relatively large size can be placed in the narrow engine room without interfering with the intake air-dispensing box 30 and the engine hood 12.

Although the embodiment of the present invention has been described in detail, it will be understood that the present invention is not limited to the above-described embodiment, and various modifications in design may be made without departing from the spirit and scope of the invention defined in the claims. For example, the present invention is applicable to an intake system in an engine for an automobile.

What is claimed is:

1. An intake system for a multi-cylinder engine, in which an intake air inlet is provided in an intake air-dispensing box to lead to an intake passage in a throttle body; the inside of said intake air-dispensing box is divided by a partition wall into first and second dispensing chambers communicating with said intake air inlet, respectively; first and second intake branch pipes opening into said first and second dispensing chambers respectively and leading to intake ports in first and second banks of the engine respectively are connected to said intake air-dispensing box; and an on-off valve capable of permitting said first and second dispensing chambers to be put into and out of communication with each other is mounted in said partition wall;
    wherein said intake air-dispensing box is comprised of a dispensing box body which includes said intake air inlet, said first and second intake branch pipes and one of halves of said partition wall, said dispensing box body having an opening provided in its outer wall opposite from said first and second intake branch pipes to extend between said first and second dispensing chambers, and a lid detachably coupled to said dispensing box body to close said opening and having the other half of said partition wall, said lid being made of a light alloy by casting, and a valve bore permitting said first and second dispensing chambers to be put into communication with each other and bearing bores for supporting a valve shaft of said on-off valve for opening and closing said valve bore are defined in the other half of said partition wall,
    wherein said dispensing box body has one wall disposed proximal to said engine and another wall disposed opposite from said one wall, said first and second intake branch pipes being formed integrally with said one wall and disposed inside said dispensing box body while said opening is formed on said another wall.

2. An intake system for a multi-cylinder engine according to claim 1, wherein the other half of said partition wall is divided into a main partition other-half body and a partition piece so that said valve bore is divided along said bearing bores into halves, said partition piece being bolted to said main partition other-half body.

3. An intake system for a V-type engine for an outboard engine system, the engine being disposed with a crankshaft placed vertically and with heads of left and right banks directed rearwards, the engine being covered with an engine hood;
    wherein an intake air inlet is provided in vertically one side of a longitudinally flat intake air-dispensing box disposed between the left and right banks and a rear wall of the engine hood so that said intake air inlet leads to an intake passage in a throttle body; the inside of said intake air-dispensing box is divided by a partition wall into left and right dispensing chambers communicating said intake air inlet, respectively and extending vertically; an on-off valve capable of permitting said left and right dispensing chambers to be put into and out of communication with each other is mounted in said partition wall; left and right intake branch pipes opening into said left and right dispensing chambers respectively and leading to intake ports in said left and right banks respectively are connected to a front wall of said intake air-dispensing box; said intake air-dispensing box is comprised of a dispensing box body which includes said intake air inlet, said left and right intake branch pipes and one of halves of said partition wall, said dispensing box body having an opening provided in its outer wall opposite from said left and right intake branch pipes to extend between said left and right dispensing chambers, and a lid which is made of a light alloy by casting and detachably coupled to said dispensing box body to close said opening and which has the other half of said partition wall; said on-off valve is mounted to a valve shaft rotatably supported in said other half and extending vertically; an operating lever is secured to an outer end of said valve shaft protruding out of toward the vertically other end of said intake air-dispensing box; and an actuator for turning said operating lever to open and close said on-off valve is mounted at said other end of said intake air-dispensing box and accommodated within an area of a vertically projected view of said intake air-dispensing box,
    wherein said dispensing box body has one wall disposed proximal to said rear wall of the engine and another wall disposed opposite from said one wall, said first and second intake branch pipes being formed integrally with said one wall and disposed inside said dispensing box body while said opening is formed on said another wall.

4. An intake system for a V-type engine for an outboard engine system according to claim 3, wherein the other half (35b) of said partition wall divided into a main partition other-half body and a partition piece so that said valve bore is divided along said bearing bores into halves, said partition piece being bolted to said main partition other-half body.

5. An intake system for a V-type engine for an outboard engine system according to claim 3 or 4, wherein a recess for accommodating said actuator is defined in the vertically other end face of said intake air-dispensing box.

6. An intake system for a multi-cylinder engine, in which an intake air inlet is provided in one end of an intake air-dispensing box disposed on one side of an engine having first and second banks so that the intake air inlet leads to an intake passage in a throttle body; the inside of said intake air-dispensing box is divided by a partition wall into first and second dispensing chambers communicating with said intake air inlet, respectively; an on-off valve capable of permitting said first and second dispensing chambers to be put into and out of communication with each other is mounted in said partition wall; and first and second intake branch pipes opening into said first and second dispensing chambers respectively and leading to intake ports in said first and second banks respectively are connected to said intake air-dispensing box;
    wherein said intake air-dispensing box is comprised of a dispensing box body which includes said intake air inlet, said first and second intake branch pipes and one of halves of said partition wall, said dispensing box body having an opening provided in its outer wall opposite from said first and second intake branch pipes to extend between said first and second dispensing chambers, and a lid made of a light alloy by casting and having the other half of said partition wall, and a valve bore permitting said first and second dispensing chambers to be put into communication with each other and bearing bores for supporting a valve shaft of said on-off valve for opening and closing said valve bore are defined in said other half; said bearing bores are made in the other half of said partition wall by drilling from a side opposite from said intake air inlet and disposed offset from a lengthwise central portion of said partition wall to a side of said partition wall opposite from said intake air inlet; and an actuator connected to said valve shaft to open and close said on-off valve is mounted at the other end of said intake air-dispensing box opposite from said intake air inlet, wherein said dispensing box body has one wall disposed proximal to said engine and another wall disposed opposite from said one wall, said first and second intake branch pipes being formed integrally with said one wall and disposed inside said dispensing box body while said opening is formed on said another wall.

7. An intake system for a multi-cylinder engine according to claim 6, wherein said intake air-dispensing box is disposed in a vertically longer shape between rearward-directed heads of the first and second banks of the engine for an outboard engine system with a crankshaft disposed vertically and a rear wall of an engine hood for the outboard engine system for covering said engine; said intake air inlet is provided in an upper end of said intake air-dispensing box; and said actuator is mounted at a lower end of said intake air-dispensing box.

8. An intake system for a multi-cylinder engine according to claim 6, wherein a plurality of said valve bores opened and closed by a plurality of said on-off valves and at least three bearing bores coaxially arranged with said valve bores interposed therebetween are made in the other half of said partition wall.

9. An intake system for a multi-cylinder engine according to claim 6 or 7, wherein the other half of said partition wall is divided into a main partition other-half body and a partition piece so that said valve bore is divided along said bearing bores into halves, said partition piece being bolted to said main partition other-half body.

10. An intake system for a multi-cylinder engine, in which an intake air inlet is provided in one end of an intake air-dispensing box disposed on one side of an engine having first and second banks so that said intake air inlet leads to an intake passage in a throttle body; the inside of said intake air-dispensing box is divided by a partition wall into first and second dispensing chambers communicating with said intake air inlet, respectively; an on-off valve capable of permitting said first and second dispensing chambers to be put into and out of communication with each other is mounted in said partition wall; and first and second intake branch pipes opening into said first and second dispensing chambers respectively and leading to intake ports in said first and second banks respectively are connected to said intake air-dispensing box;

wherein said intake air-dispensing box is comprised of a dispensing box body which includes said intake air inlet, said first and second intake branch pipes and one of halves of said partition wall, said dispensing box body having and which has an opening provided in its outer wall opposite from said first and second intake branch pipes to extend between said first and second dispensing chambers, and a lid which is made of a light alloy by casting and which has the other half of said partition wall and a loop-shaped surrounding wall integrally, projectingly provided on its inner surface and detachably coupled to an outer surface of said dispensing box body to surround said opening; a valve bore permitting said first and second dispensing chambers to be put into communication with each other and bearing bores supporting a valve shaft of said on-off valve for opening and closing said valve bore are provided in said other half; and an outward bulge is formed at a portion of said lid corresponding to said valve bore in order to enlarge said valve bore, wherein said dispensing box body has one wall disposed proximal to said engine and another wall disposed opposite from said one wall, said first and second intake branch pipes being formed integrally with said one wall and disposed inside said dispensing box body while said opening is formed on said another wall.

11. An intake system for a multi-cylinder engine according to claim 10, wherein said intake air-dispensing box is disposed in a vertically longer shape between rearward-directed heads of the first and second banks of the engine for an outboard engine system with a crankshaft disposed vertically and a rear wall of an engine hood for the outboard engine system for covering said engine; said intake air inlet is provided in an upper end of said intake air-dispensing box; and said actuator for driving said on-off valve is mounted at a lower end of said intake air-dispensing box through the valve shaft.

12. An intake system for a multi-cylinder engine according to claim 10, wherein said bearing bores are made in the other half of said partition wall from an end opposite from said intake air inlet.

13. An intake system for a multi-cylinder engine according to claim 10 or 12, wherein the other half of said partition wall is divided into a main partition other-half body and a partition piece so that said valve bore is divided along said bearing bores into halves, said partition piece being bolted to said main partition other-half body.

14. An intake system for a multi-cylinder engine according to any of claims 1, 3, 6 and 10, wherein said bearing bore rotatably supporting the valve shaft of said on-off valve and an annular seal housing adjoining an outer end of said bearing bore are defined in said intake air-dispensing box, and a seal member is mounted in said seal housing and has first and second lips protruding outwards and inwards of said intake air-dispensing box respectively to come into close contact with an outer peripheral surface of said valve shaft.

15. An intake system for a multi-cylinder engine according to claim 14, wherein said seal housing with said seal member mounted therein is defined in a lower end wall of said intake air-dispensing box through which said valve shaft disposed substantially vertically extends.

* * * * *